(12) United States Patent
Kono (10) Patent No.: US 9,630,673 B2
(45) Date of Patent: Apr. 25, 2017

(54) SADDLE-TYPE VEHICLE (75) Inventor: Sho Kono, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/397,759

(22) PCT Filed: Aug. 2, 2012

(86) PCT No.: PCT/JP2012/069757
§ 371 (c)(1),
(2), (4) Date: Oct. 29, 2014

(87) PCT Pub. No.: WO2013/179501
PCT Pub. Date: Dec. 5, 2013

(65) Prior Publication Data
US 2015/0083511 A1 Mar. 26, 2015

(30) Foreign Application Priority Data

May 28, 2012 (JP) .................. 2012-120895

(51) Int. Cl.
*F02M 37/00* (2006.01)
*B60K 15/03* (2006.01)
(Continued)

(52) U.S. Cl.
CPC ............... *B62J 37/00* (2013.01); *B60K 15/03* (2013.01); *B62J 35/00* (2013.01); *B62K 11/06* (2013.01);
(Continued)

(58) Field of Classification Search
CPC ............. F02M 25/089; F02M 25/0854; F02M 35/162; F02M 25/08; F02M 25/0836;
(Continued)

(56) References Cited

U.S. PATENT DOCUMENTS 2,592,981 A 4/1952 Violet
4,413,700 A * 11/1983 Shiratsuchi ............... B62J 17/00
180/219

(Continued)

FOREIGN PATENT DOCUMENTS

CN 1412068 A 4/1922
CN 1533944 A 10/2004
(Continued)

OTHER PUBLICATIONS

Notification of Reasons for Rejection dated Jul. 28, 2015, issued in counterpart Japanese Patent Application No. 2014-518222 (4 pages).

(Continued)

*Primary Examiner* — Paul N Dickson
*Assistant Examiner* — Daniel Yeagley
(74) *Attorney, Agent, or Firm* — Westerman, Hattori, Daniels & Adrian, LLP (57) ABSTRACT

There is provided a saddle-type vehicle that can secure a sufficient space below a fuel tank and efficiently arrange a fuel filter in a vehicle space while a fuel tank and the fuel filter are made closer to each other. The saddle-type vehicle has a seat frame 17 for supporting a seat 12, and a suspension bracket 16 extending upwards from the rear end of a main frame 14. The front portion of the seat frame 17 is secured to the upper portion of the suspension bracket 16, the front end portion of the seat frame 17 extends to the rear end portion of the fuel tank 24, and a space 241 is formed in front of the seat frame 17 and below the fuel tank 24 by the main frame 14, the suspension bracket 16 and the fuel tank 24.

7 Claims, 9 Drawing Sheets

(51) Int. Cl.
    *B62J 37/00*           (2006.01)
    *B62J 35/00*           (2006.01)
    *B62K 11/06*           (2006.01)
    *F02M 37/22*          (2006.01)
    *F02M 37/10*          (2006.01)
    *B62K 19/30*          (2006.01)

(52) U.S. Cl.
    CPC ........... *B62K 19/30* (2013.01); *F02M 37/007* (2013.01); *F02M 37/0011* (2013.01); *F02M 37/0047* (2013.01); *F02M 37/0076* (2013.01); *F02M 37/103* (2013.01); *F02M 37/22* (2013.01)

(58) Field of Classification Search
    CPC ........... F02M 37/0047; F02M 37/0076; F02M 37/0011; B60K 2015/03236; B62J 37/00; B62J 35/00
    See application file for complete search history.

(56) References Cited

U.S. PATENT DOCUMENTS

| | | | |
|---|---|---|---|
| 4,474,144 A | 10/1984 | Tanaka et al. | |
| 4,509,613 A | 4/1985 | Yamaguchi | |
| 4,984,650 A | 1/1991 | Horiike et al. | |
| 5,845,728 A * | 12/1998 | Itoh | B62K 19/02 180/219 |
| 6,182,640 B1* | 2/2001 | Nakashima | F02M 37/10 123/514 |
| 6,357,424 B1* | 3/2002 | Sonoda | F02B 61/02 123/184.21 |
| 6,902,023 B2* | 6/2005 | Brendelson | B62M 7/02 180/219 |
| 7,992,901 B2* | 8/2011 | Hirano | B62J 35/00 280/833 |
| 9,051,907 B2* | 6/2015 | Wakabayashi | F02M 37/007 |
| 2003/0075659 A1 | 4/2003 | Fukunaga et al. | |
| 2004/0206566 A1 | 10/2004 | Katsura | |
| 2004/0211610 A1 | 10/2004 | Ito et al. | |
| 2005/0045399 A1 | 3/2005 | Kudo et al. | |
| 2009/0166119 A1 | 7/2009 | Susaki | |
| 2009/0242300 A1* | 10/2009 | Mizukura | B62J 35/00 180/69.4 |
| 2010/0207416 A1 | 8/2010 | Inoue | |
| 2011/0073075 A1 | 3/2011 | Ishii | |
| 2011/0073079 A1* | 3/2011 | Ishii | B62J 37/00 123/509 |
| 2012/0060799 A1* | 3/2012 | Wakabayashi | F02M 37/007 123/495 |
| 2012/0145470 A1 | 6/2012 | Fujiyama | |
| 2012/0234302 A1* | 9/2012 | Shimura | F02M 25/089 123/521 |

FOREIGN PATENT DOCUMENTS

| | | |
|---|---|---|
| CN | 1535886 A | 10/2004 |
| CN | 1704306 A | 12/2005 |
| EP | 1602569 A1 | 12/2005 |
| EP | 1783041 A1 | 5/2007 |
| JP | 64-18990 U | 1/1989 |
| JP | 01164694 A * | 6/1989 |
| JP | 09-086468 A | 3/1997 |
| JP | 2002-225769 A | 8/2002 |
| JP | 2003-072635 A | 3/2003 |
| JP | 2003-127954 A | 5/2003 |
| JP | 2005-047404 A | 2/2005 |
| JP | 4188969 B2 | 12/2008 |
| JP | 2009-161012 A | 7/2009 |
| JP | 2010-083328 A | 4/2010 |
| JP | 2011-47294 A | 3/2011 |
| JP | 2012-052470 A | 3/2012 |

OTHER PUBLICATIONS

International Preliminary Report on Patentability dated Dec. 2, 2014, issued in International Application No. PCT/JP2012/069757 (form PCT/IB/373), with forms PCT/IB/338 and PCT/ISA/237 (5 pages).

International Search Report dated Nov. 6, 2012, issued in corresponding application No. PCT/JP2012/069757.

Search Report dated Jan. 4, 2016, issued in counterpart European Application No. 12877720.8 (7 pages).

Office Action dated Jun. 15, 2016, issued in countpart Korean Application No. 10-2014-7036371, with English machine translation (14 pages).

Office Action dated Mar. 1, 2016, issued in counterpart Chinese Patent Application No. 201280073267.2, with English translation. (17 pages).

Office Action dated Nov. 30, 2016, issued in counterpart European Patent Application No. 12 877 720.8. (9 pages).

* cited by examiner

SADDLE-TYPE VEHICLE

TECHNICAL FIELD

The present invention relates to a saddle-type vehicle having a fuel filter as auxiliary machinery disposed around a fuel tank, specifically in a space which is secured below the fuel tank.

BACKGROUND ART

There is known a saddle-type vehicle in which a fuel pump is provided in a fuel tank, a fuel filter is disposed around the fuel tank and the fuel filter is connected to the fuel pump (see Patent document 1, for example).

In the above saddle-type vehicle, seat frames extending forwards from the rear side of a vehicle body are joined to both the side surfaces of a main frame extending from the center of the vehicle body to a rear and lower side, and a cushion bracket for connecting the upper end of a rear cushion to the seat frames at the rear side of the main frame is secured. The fuel tank is supported on the upper portion of the main frame so as to straddle over the main frame, and disposed above an engine. The lower surface of the rear portion of the fuel tank extends rearwards along the seat frames. The fuel pump is contained in the fuel tank, and fuel is supplied to an injector through the fuel filter (secondary filter) disposed at the outside of the fuel tank.

A throttle body is connected to the rear portion of a cylinder head constituting a cylinder provided to the front portion of the engine, and an air cleaner box is connected to the rear portion of the throttle body through a connecting tube. The fuel filter is disposed above the connecting tube at the lower side of the fuel tank.

PRIOR ART DOCUMENT

Patent Document

Patent Document 1: JP-A-2012-52470

SUMMARY OF THE INVENTION

Problem to be Solved by the Invention

The fuel filter is disposed outside the fuel tank and around the fuel tank in consideration of workability of exchange, etc. However, it is necessary to dispose the fuel filter at such a place that a pipe extending from the fuel pump to the injector is not long. Accordingly, it is required to secure a sufficient space below the fuel tank.

Specifically, the fuel filter is disposed in a space which is formed between the throttle body and the air cleaner box and between the fuel tank and the connecting tube. Therefore, although the fuel filter is efficiently disposed in the space of the vehicle, a fuel pipe extending from the fuel pump to the fuel filter and a fuel pipe extending from the fuel filter to a pressure regulator in the fuel tank are long. It has been required to enhance assembly performance of the fuel pipes and shorten the fuel pipes to reduce the cost by making the fuel tank and the fuel filter closer to each other.

The present invention has been implemented in view of the foregoing situation, and has an object to provide a saddle-type vehicle in which a sufficient space can be secured below a fuel tank and a fuel filter can be efficiently disposed in a vehicle space while the fuel tank and the fuel filter are made closer to each other.

Means of Solving the Problem

In order to solve the above problem, according to the present invention, in a saddle-type vehicle in which a head pipe (13) and one main frame 14 disposed along a vehicle body center line (250) extending from the head pipe (13) in a front-and-rear direction of a vehicle body at the center in a vehicle width direction are arranged, a fuel tank 24 is secured to an upper portion of the main frame (14), and an engine (30) is disposed below the main frame (14), the saddle-type vehicle 1 has a seat frame (17) for supporting a seat (12) and a bracket (16) extending upwards from the rear end of the main frame (14), a front portion of the seat frame (17) is secured to an upper portion of the bracket (16), a front end portion of the seat frame (17) extends to a rear end portion of the fuel tank (24), and a space (241) is formed in front of the seat frame (17) and below the fuel tank (24) by the main frame (14), the bracket (16) and the fuel tank (24).

According to this construction, the space is formed by the fuel tank, the main frame and the bracket. Therefore, the space in which auxiliaries, etc. are arranged is formed below the fuel tank, and the degree of freedom in arrangement of parts is enhanced.

In the above construction, the front end portion of the seat frame (17) may have an extension portion (17c) extending to a front side of the upper portion of the bracket (16), and the rear end portion of the fuel tank (24) may be supported by the extension portion (17c). According to this construction, the fuel tank can be easily supported by using the extension portion at the front end of the seat frame.

Furthermore, the seat frame (17) may be provided as a pair of right and left seat frames (17), and the pair of right and left seat frames (17) may support the rear end portion of the fuel tank (24) at right and left sides thereof, respectively. According to this construction, the fuel tank can be stably supported by the right and left seat frames.

Still furthermore, in the above construction, the bracket (16) may support an upper end of a rear cushion unit (27) having a lower end portion secured to a swing arm (11). According to this construction, the bracket can serve as both a seat frame supporting unit and a rear cushion unit supporting unit.

Furthermore, in the above construction, a fuel tank supporting bracket (14A) that extends upwards and supports the fuel tank (24) may be provided to the front end of the main frame (14). According to this construction, the space can be made higher by the fuel tank supporting bracket.

Still furthermore, a cylinder axis (L) of the engine (30) extends horizontally in the front-and-rear direction. According to this construction, the main frame can be provided at a lower position.

In the above construction, an air cleaner box (40) may be disposed at a front and upper side of the engine (30). According to this construction, the space can be provided between the main frame and the engine.

In the above construction, a front end of the seat (12) mounted on the seat frame (17) is supported on an upper surface of the fuel tank (24). According to this construction, the main frame can be provided at a lower position.

In the above construction, a fuel pump (55) may be contained in the fuel tank (24), and the fuel filter (55A) may be disposed in a space (241) between the main frame (14) and the fuel tank (24). According to this construction, the fuel filter interposed between the fuel pump and the injector is disposed in the space between the fuel tank and the main frame, so that the a fuel pipe closer to the engine below the main frame can be provided, and the cost can be reduced.

A part of the fuel filter (55A) may be disposed at a lower position than the front end of the seat frame (17). According to this construction, the part of the fuel filter can be more compactly disposed in the space between the seat frame and the main frame.

According to the present invention, in a saddle-type vehicle in which a head pipe (13) and one main frame (14) disposed along a vehicle body center line (250) extending from the head pipe (13) in a front-and-rear direction of a vehicle body at the center in a vehicle width direction are arranged, a fuel tank (24) containing a fuel pump (55) therein is secured to an upper portion of the main frame (14), a fuel filter (55A) is disposed around the fuel tank (24), and an engine (30) is disposed below the main frame (14), the saddle-type vehicle (1) has a seat frame (17) for supporting a seat (12) and a bracket (16) extending upwards from the rear end of the main frame (14), a front portion of the seat frame (17) is secured to the main frame (14) through the bracket (16), and the fuel filter (55A) is disposed in a space (241) formed in an up-and-down direction between the main frame (14) and the fuel tank (24).

According to this construction, the fuel filter can be efficiently disposed in the vehicle body space by using the space between the main frame and the fuel tank. Furthermore, the fuel filter is disposed in the space between the main frame and the fuel tank, whereby the fuel tank and the fuel filter can be made closer to each other.

In the above construction, an extension portion (17c) extending to a front side of the bracket (16) may be provided to a front end portion of the seat frame (17), and a rear end of the fuel tank (24) may be supported by the extension portion (17c). According to this construction, the fuel tank can be easily supported by using the extension portion at the front end of the seat frame.

In the above construction, the bracket (16) may support an upper end of a rear cushion unit (27) for suppressing transmission of vibration from a rear wheel (3) to the main frame (14) side. According to this construction, the bracket can serve as both a seat frame supporting unit and a rear cushion unit supporting unit.

In the above construction, a fuel tank supporting bracket (14A) that extends upwards and supports the fuel tank (24) may be provided to a front end of the main frame (14). According to this construction, the space can be made higher by the fuel tank supporting bracket.

In the above construction, a cylinder axis (L) of the engine (30) may extend horizontally in the front-and-rear direction. According to this construction, the main frame can be provided at a lower position.

In the above construction, an air cleaner box (40) may be disposed at a front and upper side of the engine (30). According to this construction, a space can be provided between the main frame and the engine.

In the above construction, a front end of the seat (12) mounted on the seat frame (17) may be supported on an upper surface of the fuel tank (24). According to this construction, it is unnecessary to specially provide a seat supporting unit at the front end of the seat frame.

In the above construction, a part of the fuel filter (55A) may be disposed at a lower position than the front end of the seat frame (17). According to this construction, the part of the fuel filter can be more compactly disposed in the space between the seat frame and the main frame.

Effect of the Invention

According to the present invention, the saddle-type vehicle has the seat frame for supporting the seat and the bracket extending upwards from the rear end of the main frame, the front portions of the seat frames are secured to the upper portion of the bracket, the front end portions of the seat frames extend to the rear end portion of the fuel tank, and the space is formed in front of the seat frame and below the fuel tank by the main frame, the bracket and the fuel tank. Therefore, the space is formed by the fuel tank, the main frame and the bracket, whereby a space in which auxiliaries, etc. are arranged is formed below the fuel tank, and the degree of freedom in arrangement of parts can be enhanced.

The front end portion of the seat frame has the extension portion extending to the front side of the upper portion of the bracket, and the rear end portion of the fuel tank is supported by the extension portion. Therefore, the fuel tank can be easily supported by using the extension portion at the front end of the seat frame.

Furthermore, the seat frame is provided as a pair of right and left seat frames, and supports the right and left sides of the rear end portion of the fuel tank, so that the fuel tank can be stably supported by the right and left seat frames.

Still furthermore, the lower end of the bracket supports the upper end of the rear cushion unit secured to the swing arm. Therefore, the bracket can serve as both the seat frame supporting unit and the rear cushion unit supporting unit.

The front end of the main frame is provided with the fuel tank supporting bracket that extends upwards and supports the fuel tank, so that the space can be made higher by the fuel tank supporting bracket.

Furthermore, the cylinder axis of the engine extends horizontally in the front-and-rear direction, so that the main frame can be provided at a lower position.

The air clear box is disposed at a front and upper side of the engine, and thus the space can be provided between the main frame and the engine.

The front end of the seat mounted on the seat frame is supported on the upper surface of the fuel tank, and thus the main frame can be provided at a lower position.

The fuel pump is contained in the fuel tank, and the fuel filter is disposed in the space between the main frame and the fuel tank. Therefore, the fuel filter interposed between the fuel pump and the injector is disposed in the space between the fuel tank and the main frame, so that the fuel pipe is provided to be closer to the engine below the main frame and thus the cost can be reduced.

A part of the fuel filter is disposed at a lower position than the front end of the seat frame, and thus the part of the fuel filter can be more compactly disposed in the space between the seat frame and the main frame.

Furthermore, the saddle-type vehicle has the seat frame for supporting the seat and the bracket extending upwards form the rear end of the main frame, the front portion of the seat frame is secured to the main frame through the bracket, and the fuel filter is disposed in the space formed in the up-and-down direction between the main frame and the fuel tank. Therefore, the fuel filter can be efficiently disposed in the space by using the space between the main frame and the fuel tank. Furthermore, the fuel tank and the fuel filter can be made closer to each other by disposing the fuel filter in the space.

The front end portion of the seat frame is provided with the extension portion extending to the front side of the bracket, and the rear end of the fuel tank is supported by the extension portion, so that the fuel tank can be easily supported by using the extension portion at the front end of the seat frame.

Furthermore, the bracket supports the upper end of the rear cushion unit so that vibration from the rear wheel is not transmitted to the main frame side, and thus the bracket can serve as both the seat frame supporting unit and the rear cushion unit supporting unit.

The fuel tank supporting bracket that extends upwards and supports the fuel tank is provided at the front end of the main frame. Therefore, the space can be made higher by the fuel tank supporting bracket.

Since the cylinder axis of the engine extends horizontally in the front-and-rear direction, the engine can be provided at a lower position than the main frame.

The air cleaner box is disposed at the front and upper side of the engine, and thus the space can be provided between the main frame and the engine.

The front end of the seat mounted on the seat frame is supported on the upper surface of the fuel tank, and thus it is unnecessary to specially provide a seat supporting unit at the front end of the seat frame.

Furthermore, a part of the fuel filter is disposed at a lower position than the front end of the seat frame, and thus the part of the fuel filter can be more compactly disposed in the space between the seat frame and the main frame.

MODE FOR CARRYING OUT THE INVENTION

An embodiment according to the present invention will be described hereunder with reference to the drawings. In the description, directions such as a front-and-rear direction, a right-and-left direction and an up-and-down direction are the same as the directions associated with a vehicle body not otherwise described. In the figures, reference character FR represents the front side of the vehicle, reference character UP represents the upper side of the vehicle and reference character LE represents the left side of the vehicle.

Figure 1:
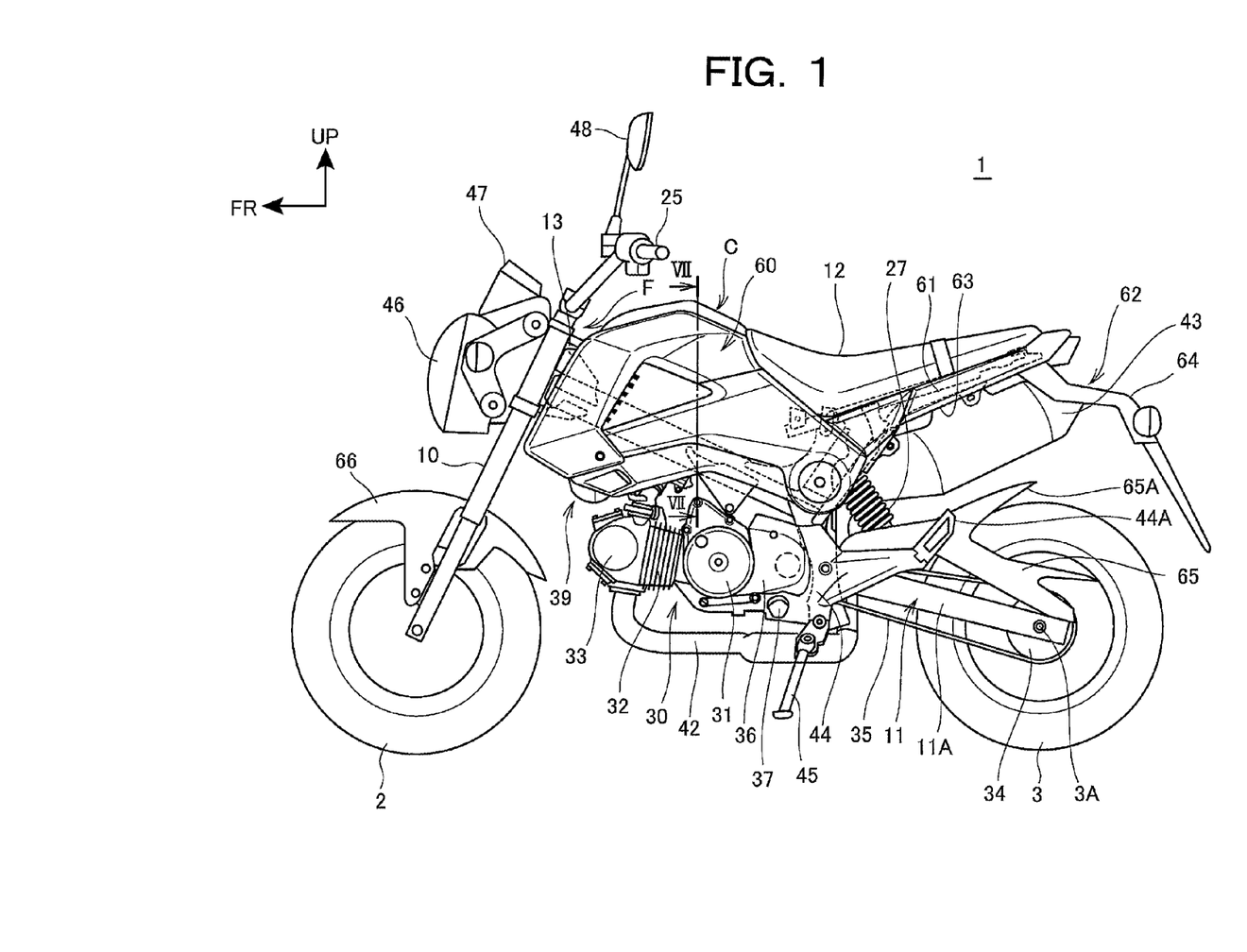
FIG. 1 is a left side view of a motorcycle according to an embodiment of the present invention.

FIG. 1 is a left side view showing a motorcycle according to an embodiment of the present invention.

The motorcycle 1 is a saddle-type vehicle in which an engine 30 is disposed at the center in the front-and-rear direction of a vehicle body frame F, a front fork 10 supporting a front wheel 2 is steerably supported at the front end of the vehicle body frame F, a swing arm 11 supporting a rear wheel 3 is provided at the rear portion side of the vehicle body frame F, and a seat 12 on which an occupant sits is provided at the upper side of the vehicle body frame F. Most of the vehicle body frame F is covered by the vehicle body cover C formed of resin.

Figure 2:
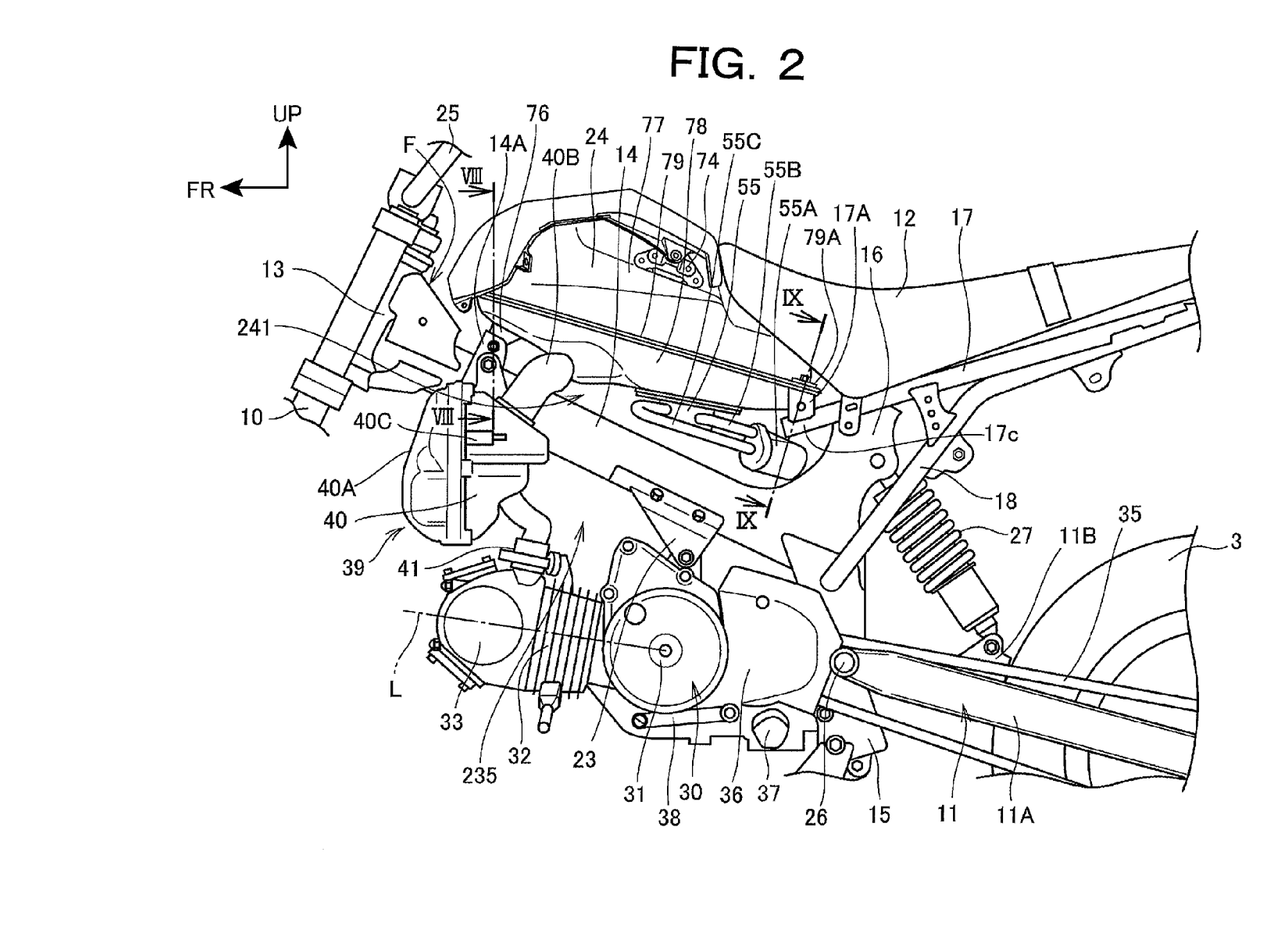
FIG. 2 is a let side view of a main part of the motorcycle from which most of a vehicle body cover is detached.
Figure 3:
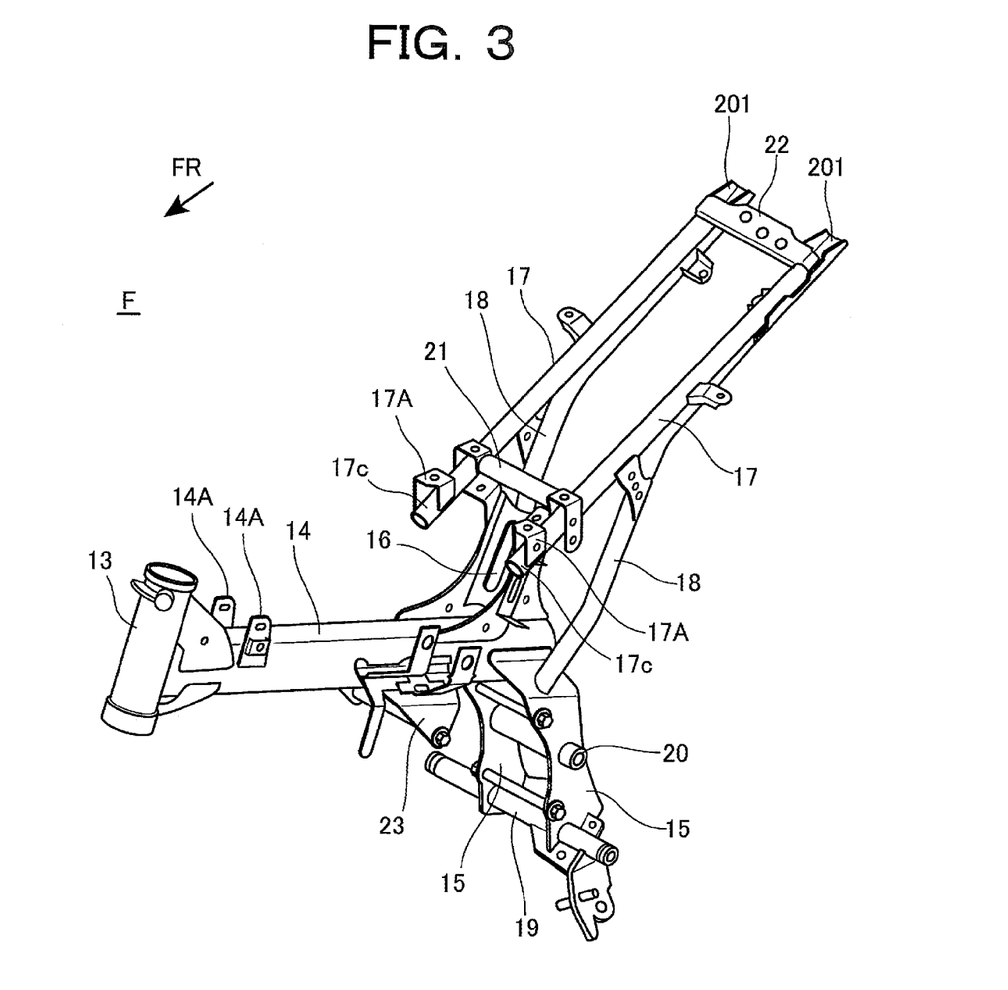
FIG. 3 is a perspective view of a vehicle body frame.

FIG. 2 is a left side view of a main part of the motorcycle 1 under a state that most of the vehicle body cover C is detached. FIG. 3 is a perspective view of the vehicle body frame F.

Referring to FIG. 3, the vehicle body frame F has a head pipe provided at the front end thereof, a single main frame 14 extending while inclined from the head pipe 13 to the rear and lower side, a pair of right and left center frames 15, 15 which extend from the right and left side surfaces of the rear portion of the main frame 14 outwards in the vehicle width direction and then extend downwards, a suspension bracket 16 extending rearwards and upwards from the upper surface portion of the rear portion of the main frame 14 to the seat 12 (see FIG. 1) side, a pair of right and left seat frames 17, 17 which are supported by the upper end portion of the suspension bracket 16 at the front portions thereof and extend rearwards and upwards to the rear portion of the vehicle, a pair of right and left sub frames 18, 18 which extend rearwards and upwards behind the suspension bracket 16 and connect the upper portions of the center frames 15, 15 and the intermediate portions in the front-and-rear direction of the seat frames 17, 17, and a pair of right and left rear end connecting members 201 which connect the respective rear ends of the seat frames 17, 17 and the sub frames 18, 18.

A lower cross pipe 19 through which the right and left center frames 15, 15 are connected to each other is provided to the lower portions of the center frames 15, 15. A cross pipe 20 through which the right and left center frames 15, 15 are connected to each other is provided to the intermediate portions in the up-and-down direction of the center frames 15, 15.

A front cross member 21 and a rear cross member 22 for connecting the right and left seat frames 17, 17 are provided to the front and rear portions of the seat frames 17, 17. A pair of right and left rear-side tank stays 17A, 17A to which a fuel tank 24 (see FIG. 2) is fixed are provided to extension portions 17c, 17c of the seat frames 17, 17 which extend to the front side of the connection portions of the seat frames 17, 17 with the suspension bracket 16.

A pair of right and left engine hungers 23 to which an engine 30 (see FIG. 1) is fixed are provided to an intermediate portion in the front-and-rear direction of the main frame 14. A pair of right and left front tank stays 14A, 14A to which the fuel tank 24 is fixed are provided to the upper surface of the front portion of the main frame 14.

As shown in FIG. 2, the fuel tank 24 is provided above the main frame 14, and extends from the rear side of the head pipe 13 to the front side of the seat frames 17, 17 (the right-side seat frame is not shown). A seat 12 is provided to be continuous with the rear portion of the fuel tank 24, and extends along the upper surfaces of the seat frames 17, 17 to the rear portion of the vehicle.

A front fork 10 is freely turnably supported by the head pipe 13 through a steering shaft (not shown), and the front wheel 2 is supported through a shaft by the lower portions of the front forks 10 as shown in FIG. 1. A steering handle 25 is fixed to the upper ends of the front forks 10.

In FIGS. 1 and 2, a swing arm 11 has a pair of right and left arm portions 11A (only the arm portion 11A at the left side is shown) extending rearwards from the outer surface sides of the center frames 15, 15, and a cross member (not shown) connecting the right and left arm portions 11A, 11A at the front portion of the swing arm 11. The rear wheel 3 is supported by an axle 3A bridged between the arm portions 11A, 11A at the rear portion of the swing arm 11. The swing arm 11 is connected to the center frames 15, 15 by a pivot shaft 26 inserted in the front ends of the arm portions 11A, 11A, and is freely vertically swingable around the pivot shaft 26. The pivot shaft 26 is inserted in the cross pipe 20 (see FIG. 3).

The lower end of a cylindrical rear cushion unit 27 is freely swingably connected to a lower bracket 11B provided to the cross member of the swing arm 11, and the upper end of the rear cushion unit 27 is freely swingably connected to the suspension bracket 16 of the vehicle body frame F.

The engine 30 is an air-cooled single cylinder type 4-cycle engine, and it is a horizontal engine whose cylinder shaft L is greatly tilted forwards until it is set to a state near to a substantially horizontal state. The engine 30 is constructed by a crank case 31 containing a crank shaft (not shown) and a transmission mechanism (not shown), a cylinder 32 and a cylinder head 33 which are successively arranged from the rear side. Since the engine 30 is a horizontal engine, the center of gravity of the vehicle body can be lowered. An output shaft (not shown) of the engine 30 protrudes from the left side surface of the rear portion of the crank case 31, and the rear wheel 3 is driven by a driving chain 35 which is suspended between a driving sprocket (not shown) secured to the output shaft and a driven sprocket 34 secured the rear wheel 3. The driving sprocket of the output shaft is covered by a sprocket cover 36.

A pair of right and left steps 37, 37 (only the left-side step 37 is illustrated) on which an occupant sitting on the seat 12 puts his/her feet are provided to the lower portions of the right and left side surfaces of the rear portion of the crank case 31. A shift pedal 38 used for transmission operation of the transmission mechanism is provided in front of the left-side step 37.

The upper portion of the front portion of the crank case 31 is fixed to the right and left engine hungers 23, and the rear portion of the crank case 31 is fixed to the right and left center frames 15, whereby the engine 30 is supported by the vehicle body frame F.

In the motorcycle 1, the engine 30 as the horizontal engine is supported to be suspended from the main frame 14 which is inclined downwards. Therefore, a space 235 is secured between the front portion of the main frame 14 and the engine 30, and an air intake device 39 is disposed in this space 235. The air intake device 39 has an air cleaner box 40 for cleaning sucked air, and a throttle body 41 which is connected to an air intake port in the upper surface of the engine 30 and supplies air from the air cleaner box 40 to the engine 30. The throttle body 41 is provided with an injector (not shown) for jetting fuel supplied from the fuel tank 24 to an air intake passage.

The air cleaner box 40 is formed like a large box which expands substantially fully in the space between the lower surface of the front portion of the main frame 14 and the upper surface of the cylinder head 33. The air cleaner box 40 is configured to be divided into two parts in the front-and-rear direction, and maintenance can be easily performed on a filter in the air cleaner box 40 by detaching a lid portion 40A at the front side. Furthermore, an air intake duct 40B serving as a port for taking air into the air cleaner box 40 passes from the rear portion of the left portion of the air cleaner box 40 through the left side of the main frame 14, extends rearwards and upwards, and opens rearwards at the lower side of the fuel tank 24. A fitting portion 40C projecting rearwards is formed at the end portion in the vehicle width direction of the air cleaner box 40, and fitted to a tank cover 60 described later.

The throttle body 41 is disposed between the cylinder head 33 and the main frame 14 at the rear side of the air cleaner box 40, and connected to an air intake port at the upper surface of the cylinder head 33.

An exhaust pipe 42 is connected to an exhaust port in the lower surface of the cylinder head 33. The exhaust pipe 42 is connected to a muffler 43 which extends from the exhaust port downwards, bends rearwards, extends rearwards, bends upwards at the rear side of the center frame 15, and then is fixed to the seat frame 17 at the right side.

A plate-like step stay 44 is provided to the side surface of each of the right and left center frames 15 so as to cover the front end of the swing arm 11 from the side, and a tandem step 44A on which a fellow passenger puts his/her foot is provided to the rear end of the step stay 44.

A side stand 45 is secured to the lower end of the left-side center frame 15.

A head light unit 46 and a meter unit 47 are secured to the front portion of the head pipe 13 through a stay (not shown). A back mirror 48 is provided to the handle 25.

The vehicle body cover C has a tank cover 60 covering the fuel tank 24, the main frame 14 and the air cleaner box 40, and a pair of right and left rear side covers 61, 61 (only the left-side rear side cover 61 is illustrated) which cover the right and left seat frames 17, 17 from the sides thereof. A rear fender 62 is provided above the rear wheel 3. The rear fender 62 has a front-side rear fender 63 which covers the seat frames 17, 17 from the lower side and a rear-side rear fender 64 to which a license plate, etc. are secured. A chain cover 65 which covers the driving chain 35 from the upper side thereof is secured to the swing arm 11, and a mudguard portion 65A covering the rear wheel 3 from the upper side thereof is formed in the chain cover 65.

A front fender 66 which covers the front wheel 2 from the upper side is secured to the front fork 10.

As shown in FIG. 2, the fuel tank 24 is a box-type tank containing a fuel pump 55 for supplying the engine 30 with fuel, and it is formed by joining an upper half body 77 constituting an upper portion and a lower half body 78 constituting a lower portion. A flange portion 79 serving as the joint portion between the upper half body 77 and the lower half body 78 is formed on the side surface portion of the fuel tank 24 so as to make a circuit on the side surface of the fuel tank 24. As described above, the fuel tank 24 is configured to be divided into two parts in the up-and-down direction, and the two parts are joined to each other at the flange portion 79 of the side surface portion, whereby the fuel tank 24 can be easily manufactured.

A front stay 76 provided to the front and lower portion of the fuel tank 24 is fixed to the main frame 14 through the front tank stays 14A, a pair of right and left rear fixing portions 79A (only the left-side rear fixing portion 79A is illustrated) provided to the rear portion of the flange portion 79 are fixed to the rear side tank stays 17A provided to the seat frames 17, 17 (the right-side seat frame is not illustrated) above the suspension bracket 16 while floated from the upper surface of the main frame 14, and a space 241 is formed between the fuel tank 24 and the upper surface of the main frame 14. The fuel filter 55A of the fuel pump 55 is disposed in this space 241. The fuel filter 55A is designed in a cylindrical shape, and connected to the lower portion of the fuel pump 55 by a pair of fuel hoses 55B, 55C.

Figure 4:
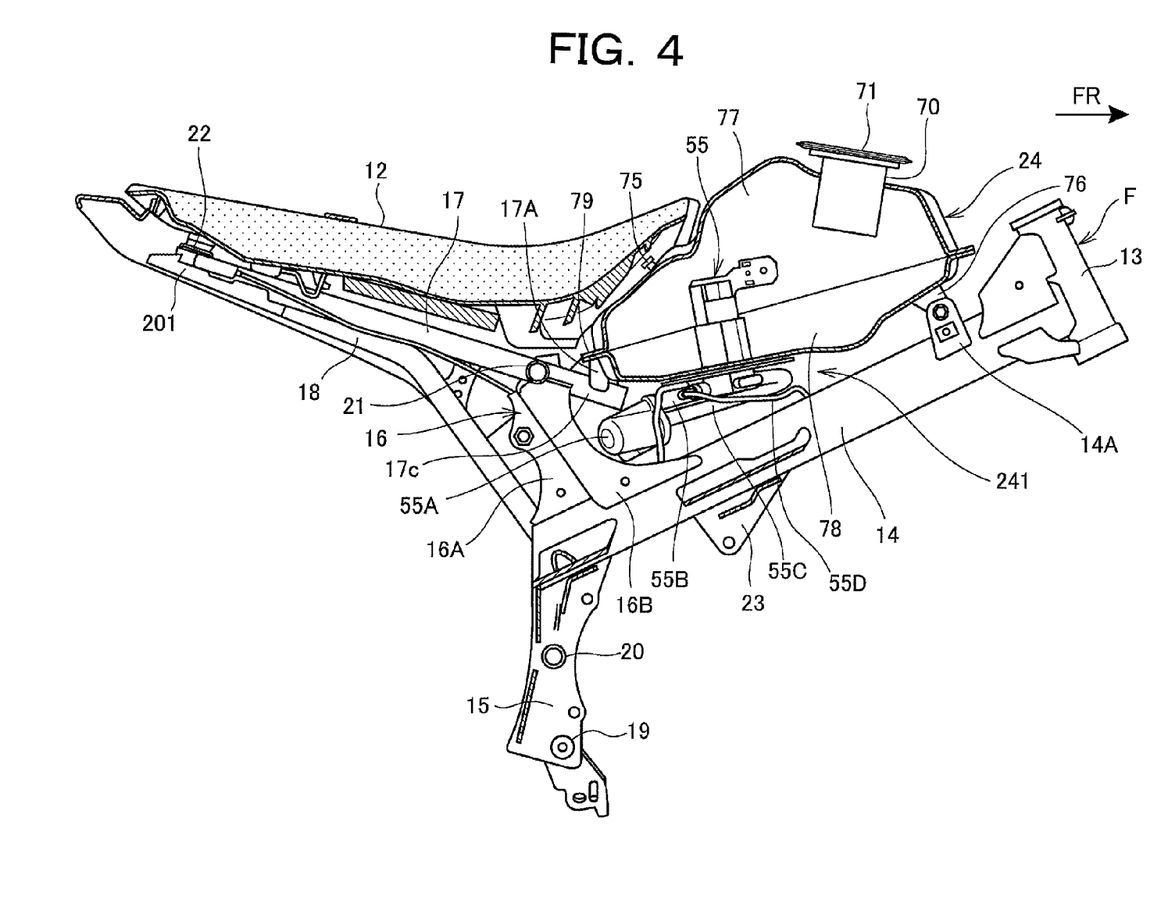
FIG. 4 is a cross-sectional view showing a main part of the motorcycle.

FIG. 4 is a cross-sectional view showing a main part of the motorcycle 1, and shows the cross-sections of the vehicle body frame F, the fuel tank 24, the seat 12, etc.

As shown in FIGS. 3 and 4, the suspension bracket 16 constituting the vehicle body frame F comprises a bracket main body 16A to which the upper end of the rear cushion unit 27 (see FIG. 2) is secured, and a reinforcing member 16B which is secured to the front portion of the bracket main body 16A and the main frame 14 to reinforce the bracket main body 16A, and the upper end portion of the reinforcing member 16B is connected to the right and left seat frames 17, 17 and the front cross member 21.

The rear ends of the right and left sub frames 18, 18 are located ahead of the rear ends of the seat frames 17, 17 with respect to the vehicle body, the rear ends of the sub frames 18, 18 are disposed below the seat frames 17, 17, and rear end connecting members 201, 201 extending in the front-and-rear direction are secured to the rear end portions of the sub frames 18, 18 and the rear portions of the seat frames 17, 17.

In FIG. 4, the fuel pump 55 secured to the bottom portion of the fuel tank 24 is contained in the fuel tank 24, and the fuel filter 55A which is connected to the fuel pump 55 through the fuel hoses 55B, 55C is disposed in the neighborhood of the fuel pump 55.

The fuel filter 55A is disposed in the space formed between the fuel tank 24 and the main frame 14. Here, the space 241 is a portion surrounded by the fuel tank 24, the main frame 14, the front tank stays 14A, the front stay 76 provided to the front and lower portion of the fuel tank 24, the rear side tank stays 17A, the seat frames 17, 17 (only the left-side seat frame 17 is illustrated), and the suspension bracket 16 in side view.

Specifically, the fuel filter 55A is disposed at the rear end of the space 241, and a part of the fuel filter 55A is disposed at a lower position than the seat frames 17, 17.

The fuel tank has been hitherto mounted so as to straddle the main frame, and thus no part has been disposed between the fuel tank and the main frame. However, according to this embodiment, the fuel filter 55A is disposed in the space 241 which is formed in the up-and-down direction between the fuel tank 24 and the main frame 14, whereby the fuel filter 55A can be efficiently disposed in the vehicle body space.

Furthermore, a part of the fuel filter 55A is disposed at the rear end of the space 241 and also at a lower position than the front ends of the seat frames 17, 17. Therefore, the fuel filter 55A can be compactly disposed in the space 241, and other parts (the air intake duct 40B, etc. shown in FIG. 2) can be disposed in the space 241 (for example, at the front end side of the space 241).

Furthermore, the space 241 is a portion which is flat in the up-and-down direction. Therefore, the fuel pump 55 and the fuel filter 55A can be arranged to be close to each other, and the fuel hoses 55B, 55C can be arranged substantially along the bottom portion of the fuel tank 24 and the upper surface of the main frame 14 while being little bent in the up-and-down direction, so that the total length of the fuel hoses 55B, 55C can be shortened. As a result, the work of connecting the fuel hoses 55B, 55C to the fuel pump 55 and the fuel filter 55A can be easily performed, and the cost of the materials of the fuel hoses 55B, 55C can be reduced.

Figure 5:
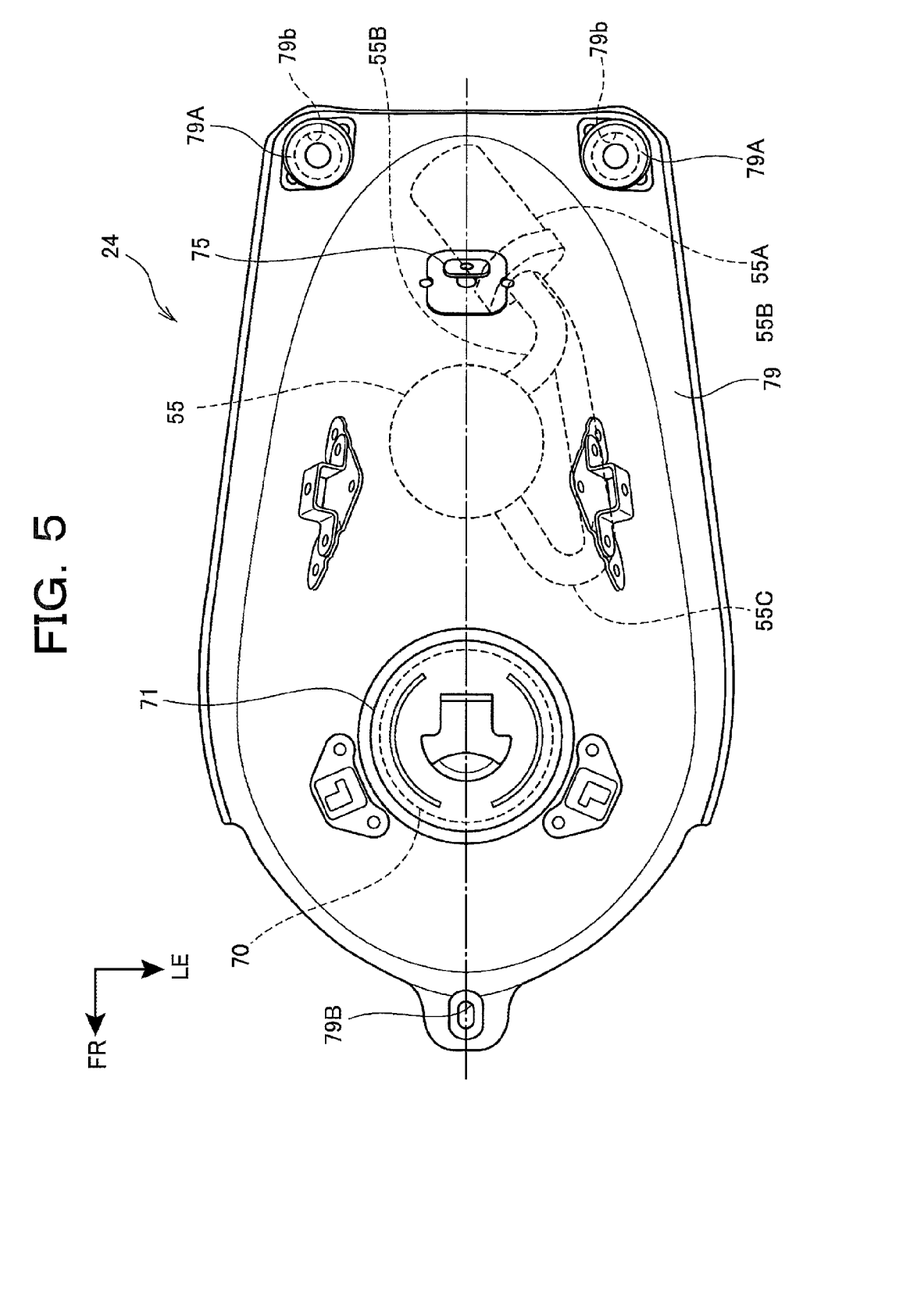
FIG. 5 is a plan view showing a fuel tank.

FIG. 5 is a plan view showing the fuel tank 24.

A fuel filler opening 70 is provided at the center in the vehicle width direction on the upper surface of the front portion of the fuel tank 24. The fuel filler opening 70 is formed in a cylindrical shape, and the upper portion thereof projects upwards from the upper surface of the fuel tank 24.

The fuel filler opening 70 is blocked by a fuel filler opening cap 71 so as to be freely openable and closable. An engaging convex portion 75 which is engaged with an engaging portion (not shown) provided to the lower surface of the front end of the seat 12 (see FIG. 2) is provided at the center in the vehicle width direction on the upper surface of the rear portion of the fuel tank 24.

A pair of right and left rear fixing portions 79A, 79A which are fastened to the rear tank stays 17A, 17A (see FIG. 3) of the seat frames 17, 17 (see FIG. 3) are provided to the rear portion of the flange portion 79 of the fuel tank 24. An engaging hole portion 79B to which the tank cover 60 (see FIG. 1) is fixed is formed at the flange portion 79 of the front end of the fuel tank 24.

The fuel filter 55A is disposed at the rear side of the fuel pump 55 disposed in the fuel tank 24 with respect to the vehicle body and at the lower side of the center in the vehicle width direction of the fuel tank 24.

Figure 6:
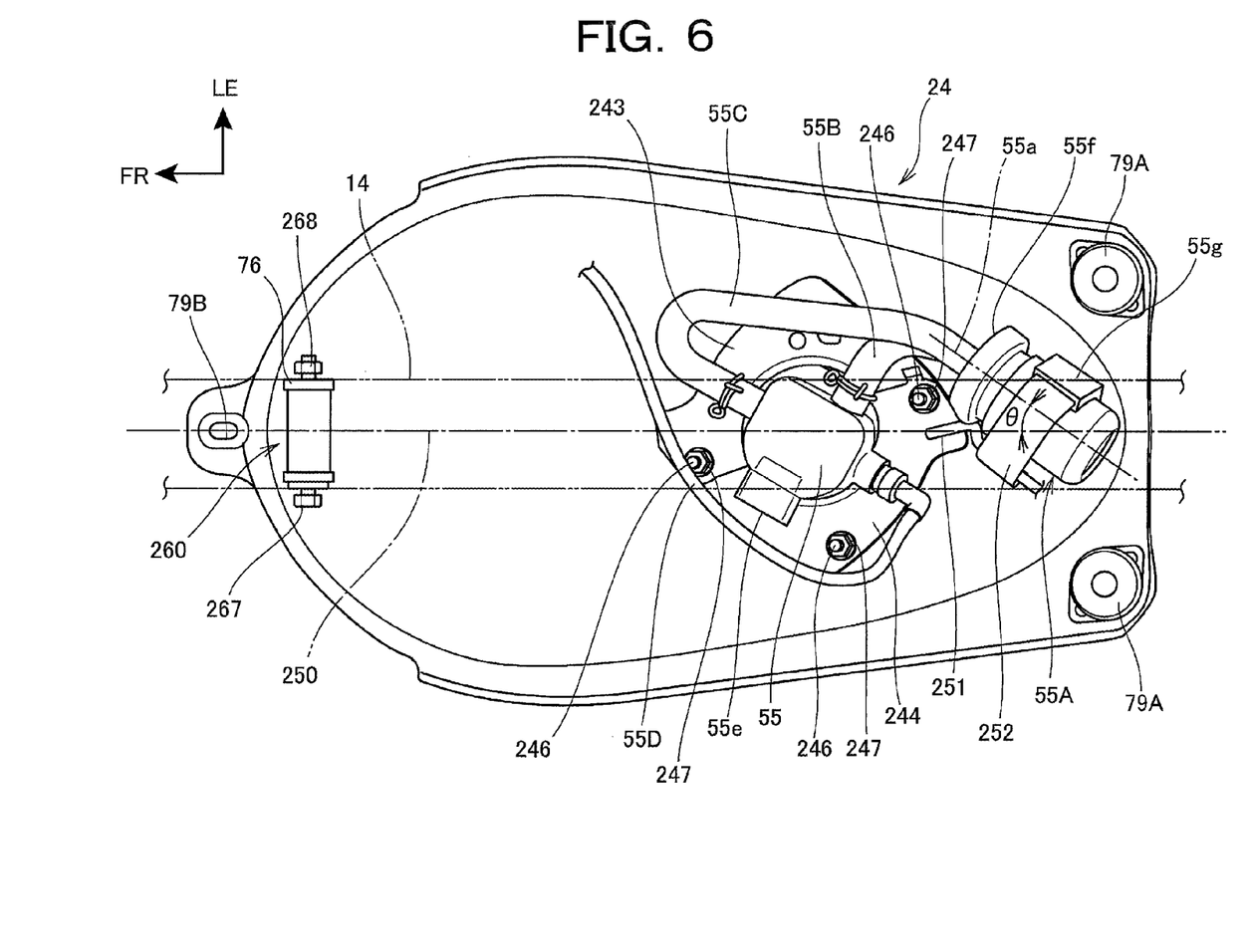
FIG. 6 is a bottom view of a fuel tank, a fuel pump, a fuel filter and the peripheries thereof.

FIG. 6 is a bottom view of the fuel tank 24, the fuel pump 55, the fuel filter 55A and the circumferences thereof.

The fuel tank 24 is disposed so that the center line extending in the front-and-rear direction of the vehicle at the center in the vehicle width direction is overlapped with the center line 250 of the vehicle body which passes the center in the vehicle width direction of the vehicle body and extends in the front-and-rear direction of the vehicle, and the main frame 14 is disposed along the center line 250 of the vehicle body 250.

The fuel filter 55A is disposed so as to be overlapped with the center line 250 of the vehicle body, and the axial line 55a of the fuel filter 55A is inclined at an angle θ with respect to the center line 250 of the vehicle body. Hose connection ports to which the fuel hoses 55B and 55C are connected respectively are provided to one end face 55f of the fuel filter 55A. Therefore, even when the fuel pump 55 and the fuel filter 55A are close to each other, the angle θ makes it easy to connect the fuel hoses 55B and 55B to the fuel filter 55A.

The fuel pump 55 and the fuel filter 55A are connected to the fuel hose 55B at the fuel supply side for supplying fuel from the fuel pump 55 to the fuel filter 55A and the fuel hose 55C at the fuel return side for returning the fuel from the fuel filter 55A to the fuel pump 55. The fuel hose 55B is piped to be short and L-shaped in plan view, and the fuel hose 55C is piped in a fishhook-like shape to be longer than the fuel hose 55B. The fuel hose 55B is disposed above the fuel hose 55C at the connection portion with the fuel filter 55A. A fuel supply hose 55D for supplying fuel to the throttle body 41 (see FIG. 2) extends from the fuel pump 55. Reference numeral 55e represents a pump-side connector to which a connector of a harness for supplying power to a motor provided to the fuel pump 55 is connected.

The fuel pump 55 is secured to the bottom portion of the fuel tank 24 by two setting plates 243, 244 which are substantially arcuate in shape. A support plate 252 is secured to one setting plate 244 through a stay 251, and the tip portion of the support plate 252 is fitted to a fitted portion 55g formed on the outer peripheral surface of the fuel filter 55A, whereby the fuel filter 55A is supported.

A manner of securing the fuel pump 55 will be described hereunder.

First, the fuel pump 55 is inserted from the lower side into the opening formed in the bottom portion of the fuel tank 24, plural bolts 246 which are provided to the edge of the opening of the fuel tank 24 so as to project downwards are made to penetrate through the flange portion provided to the lower portion of the fuel pump 55 so that the flange portion is brought into contact with the edge of the opening. Two setting plates 243, 244 are superimposed on the flange portion from the lower side so as to form a substantially circular shape, and the plural bolts 246 are made to penetrate through the setting plates 243, 244. Subsequently, the nuts are thread-connected to the respective tips of the plural bolts 246, whereby the installation of the fuel pump 55 to the fuel tank 24 is completed.

Figure 7:
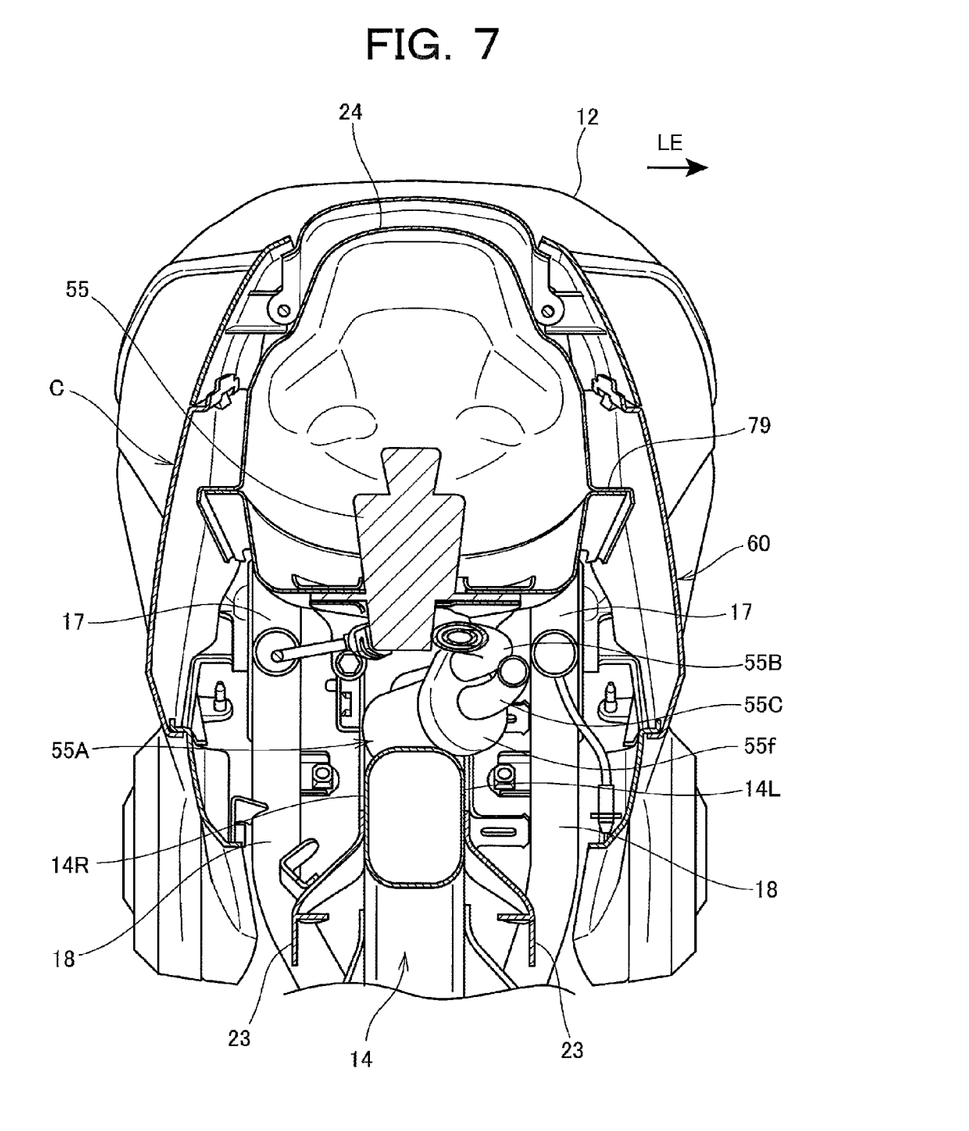
FIG. 7 is a cross-sectional view taken along VII-VII line of FIG. 1.

FIG. 7 is a cross-sectional view taken along VII-VII line of FIG. 1.

The fuel pump 55 is provided at the center in the vehicle width direction of the bottom portion of the fuel tank 24, and the fuel filter 55A is disposed below the fuel tank 24 and above the main frame 14 which is designed like a square pipe. Specifically, the fuel filter 55A is disposed to be located on the same plane as the right side surface 14R of the main frame 14 or at the left side of the right side surface 14R and also project to the left side of the left side surface 14L of the main frame 14.

As described above, the fuel filter 55A is disposed above the main frame 14 disposed at the center in the vehicle width direction and below the fuel tank 24, whereby the fuel filter 55A and the fuel pump 55 can be disposed to be closer to each other. Furthermore, the lower side of the fuel filter 55A is covered by the main frame 14, so that the fuel filter 55A can be protected from stepping stones, etc. from the road surface.

Figure 8:
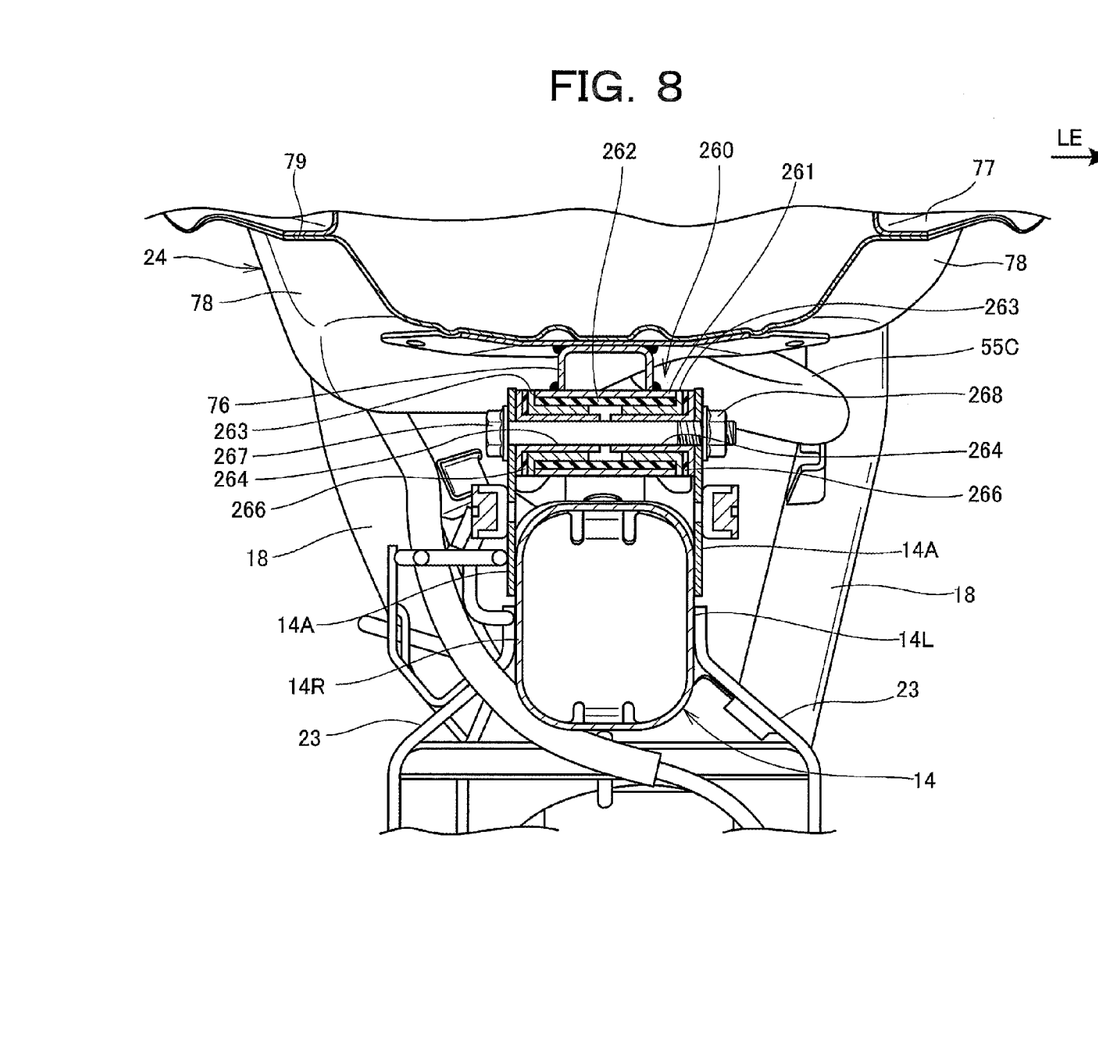
FIG. 8 is a cross-sectional view taken along VIII-VIII line of FIG. 2.

FIG. 8 is a cross-sectional view taken along VIII-VIII line of FIG. 2.

The front-side tank stays 14A, 14A at the main frame 14 side are flat-plate type plates that are secured to the left-side and right-side surfaces 14L and 14R of the main frame 14 so as to extend upwards, and the front stay 76 at the fuel tank 24 side is a part having a U-shaped cross-section.

A front-side joint portion 260 which joins the front-side tank stays 14A, 14A and the front stay 76 comprises an outer cylinder 261 secured to the lower end of the front stay 76, outer collars 263, 263 with flanges which are respectively inserted in the outer cylinder 261 through a cylindrical rubber 262 from both the end sides, inner collars 264, 264 with flanges which are inserted from the respective flange sides of the outer collars 263, 263, a doughnut-shaped plate type rubber 266 disposed between the respective flanges of the outer color 263 and the inner collar 264, a bolt 267 penetrating through the front-side tank stays 14A, 14A and the inner collars 264, 264, and a nut 268 which is thread-connected to the tip portion of the bolt 267.

The cylindrical rubber 262 is disposed in a direction orthogonal to the axial direction of the bolt 267 at the front-side joint portion 260, and the doughnut-shaped plate type rubber 266 is disposed in the axial direction of the bolt 267, thereby allowing the displacement of the front portion of the fuel tank 24 in the front-and-rear direction of the vehicle body, the up-and-down direction and the right-and-left direction of the vehicle body with respect to the main frame 14.

Figure 9:
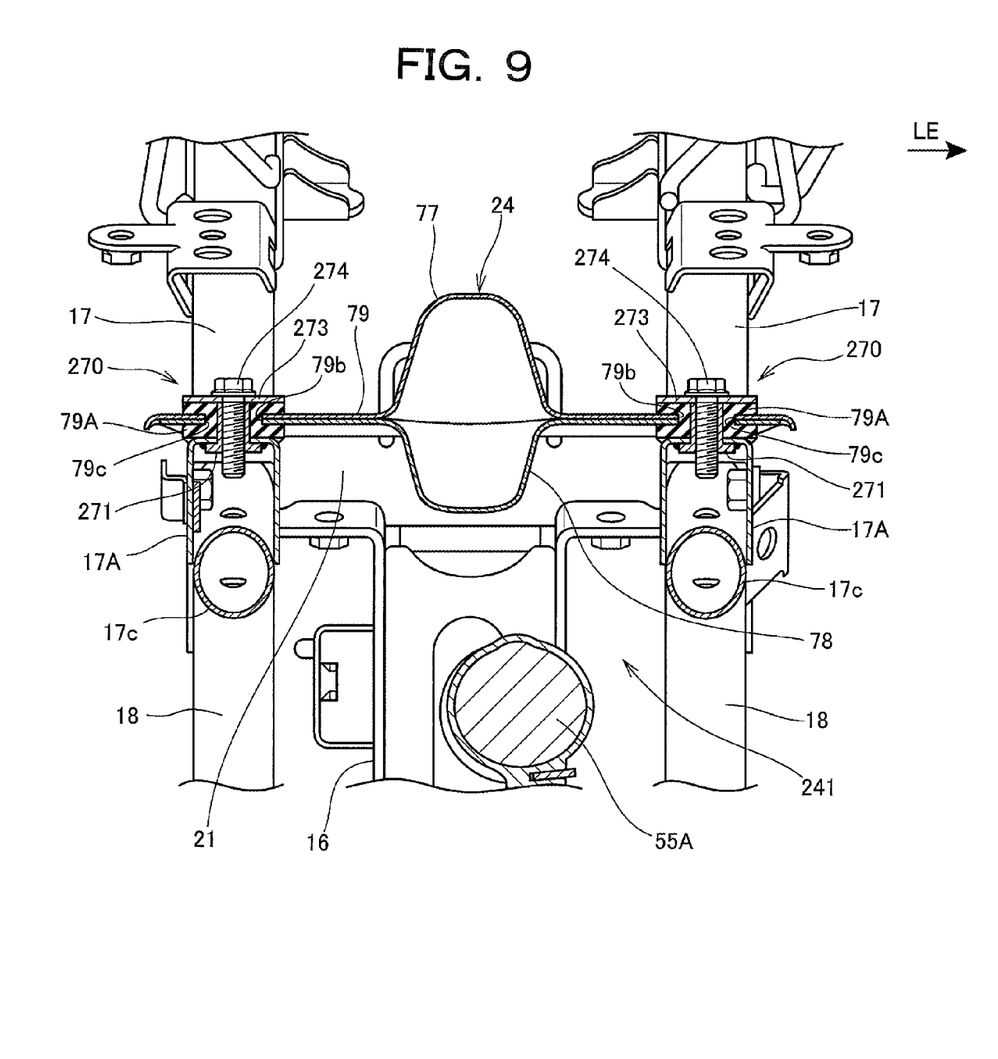
FIG. 9 is a cross-sectional view taken along IX-IX line of FIG. 2.

FIG. 9 is a cross-sectional view taken along IX-IX line of FIG. 2.

The rear-side tank stays 17A at the seat frame 17 side are parts which are U-shaped in cross-section, and the rear end portion of the flange portion 79 of the fuel tank 24 is secured to the pair of right and left rear-side tank stays 17A, 17A through a pair of right and left rear-side joint portions 270, 270.

The rear-side joint portion 270 comprises a collar 271 with a flange which is secured to penetrate through the upper portion of the rear-side tank stay 17A, a rear fixing portion (rubber bush) 79A formed of rubber which is fitted to the upper portion of the collar 271 and has an annular groove 79c fitted to a hole 79b formed in the flange portion 79 of the fuel tank 24, a washer 273 abutting against the upper surface of the rear fixing portion 79A, and a bolt 274 which penetrates through the washer 273, the rear fixing portion 79A from the upper side to the lower side and is thread-connected to an internal thread formed on the collar 271.

As described above, the flange portion 79 of the fuel tank 24 is secured to the rear-side tank stay 17A through the rear fixing portion 79A as a rubber bush, thereby allowing the displacement of the fuel tank 24 in the front-and-rear direction of the vehicle body, the up-and-down direction and the right-and-left direction of the vehicle body with respect to the seat frames 17, 17 and enabling the fixing strength between the fuel tank 24 and the seat frame 17.

As shown in FIGS. 2, 3, 4 and 6, in the motorcycle 1 (see FIG. 1) as the saddle-type vehicle in which the head pipe 13 and one main frame 14 disposed along the vehicle body center line 250 extending from the head pipe 13 in the front-and-rear direction of the vehicle body at the center in the vehicle width direction are disposed, the fuel tank 24 is secured to the upper portion of the main frame 14, and the engine 30 is disposed below the main frame 14, the motorcycle 1 has the seat frames 17 for supporting the seat 12 and the suspension bracket 16 as the bracket extending from the rear end of the main frame 14 upwards, the front portions of the seat frames 17 are secured to the upper portion of the suspension bracket 16, the front end portions of the seat frames 17 extend to the rear end portion of the fuel tank 24, and the space 241 is formed in front of the seat frames 17 and below the fuel tank 24 by the main frame 14, the suspension bracket 16 and the fuel tank 24.

According to this construction, the space 241 is formed by the fuel tank 24, the main frame 14 and the suspension bracket 16, whereby a space for disposing auxiliaries, etc. is formed below the fuel tank 24. Therefore, the degree of freedom in arrangement of parts can be enhanced.

As shown in FIGS. 3 and 4, a pair of right and left seat frames 17 are provided, and support the rear end portion of the fuel tank 24 at the right and left sides, so that the fuel tank can be stably supported by the right and left seat frames.

Furthermore, as shown in FIG. 2, the lower end of the suspension bracket 16 supports the upper end of the rear cushion unit 27 secured to the swing arm 11. Therefore, the suspension bracket 16 can serve as both a seat frame supporting unit and a rear cushion unit supporting unit.

Still furthermore, as shown in FIG. 2 and FIG. 4, the fuel pump 55 is contained in the fuel tank 24, and the fuel filter 55A is disposed in the space 241 between the main frame 14 and the fuel tank 24. Therefore, the fuel filter 55A interposed between the fuel pump 55 and the injector (not shown) provided at the throttle body 41 side can be disposed in the space 241 between the fuel tank 24 and the main frame 14, so that a fuel pipe closer to the engine 30 below the main frame 14 can be provided and the fuel pipe can be shortened. Therefore, the cost can be reduced.

As shown in FIGS. 1 and 2, in the motorcycle 1 as a saddle type vehicle in which the head pipe 13 and the one main frame 14 disposed along the vehicle body center line 250 extending from the head pipe 13 in the vehicle front-and-rear direction at the center in the vehicle width direction are disposed, the fuel tank 24 which contains the fuel pump 55 therein is secured to the upper portion of the main frame 14, the fuel filter 55A is disposed around the fuel tank 24, and the engine 30 is disposed below the main frame 14, the motorcycle 1 has the seat frame 17 for supporting the seat 12, and the suspension bracket 16 as the bracket extending from the rear end of the main frame 14 upwards, the front portion of the seat frame 17 is secured to the main frame 14 through the suspension bracket 16, and the fuel filter 55A is disposed in the space 241 formed in the up-and-down direction between the main frame 14 and the fuel tank 24.

According to this construction, the fuel filter 55A can be efficiently disposed in the space 241 by using the space 241 between the main frame 14 and the fuel tank 24. Furthermore, the fuel filter 55A can be disposed in the space 241 between the main frame 14 and the fuel tank 24, whereby the fuel tank 24 and the fuel filter 55A can be made closer to each other. Therefore, the productivity can be enhanced by enhancing the assembling performance of the fuel hoses 55B, 55C as the fuel pipes, and the cost can be reduced by shortening the fuel hoses 55B, 55C.

As shown in FIGS. 1, 2 and 3, the seat frames 17 are provided with the extension portions 17c extending to the front side of the suspension bracket 16 at the front end portions thereof, and the rear end of the fuel tank 24 is supported by the extension portions 17c. Therefore, the fuel tank 24 can be easily supported by using the extension portions 17c at the front ends of the seat frames 17, it is unnecessary to specially provide a support member for the fuel tank 24, and the cost can be reduced by suppressing addition of parts.

The suspension bracket 16 supports the upper end of the rear cushion unit 27 which suppresses transmission of vibration from the rear wheel 3 to the main frame 14 side. Therefore, the suspension bracket 16 can serve as both a seat frame supporting unit and a rear cushion unit supporting unit, and the number of parts can be reduced, so that the cost can be reduced.

The front-side tank stays 14A as the fuel tank support brackets which extend upwards and support the fuel tank 24 are provided to the front end of the main frame 14. Therefore, the space 241 is made higher by the front-side tank stays 14A, and the degree of freedom in arrangement of the fuel filter 55A in the space 241 can be increased.

Furthermore, the cylinder axis L of the engine 30 extends horizontally in the front-and-rear direction. Therefore, the main frame 14 can be provided at a lower position, so that the space 241 can be made higher, and the degree of freedom in arrangement of the fuel filter 55A in the space 241 can be increased.

The air cleaner box 40 is disposed at the front and upper side of the engine 30, and thus the space 235 can be provided between the main frame 14 and the engine 30. Therefore, a part other than the air cleaner box 40, for example, the air intake device 39 can be disposed in the space 235.

As shown in FIGS. 4 and 5, the front end of the seat 12 mounted on the seat frames 17 is supported on the supper surface of the fuel tank 24, specifically, the engaging convex portion 75 provided to the upper surface of the rear portion of the fuel tank 24 is engaged with the engaging portion provided to the lower surface of the front end of the seat 12, so that it is unnecessary to specially provide a seat supporting unit at the front end of the seat frames 17. Therefore, the number of parts can be reduced, and the weight and the cost can be reduced.

A part of the fuel filter 55A is disposed below the front ends of the seat frames 17. Therefore, the part of the fuel filter 55A can be more compactly disposed in the space 241 among the seat frames 17 and the main frame 14, and when another part is disposed in the space 241, the degree of freedom in arrangement of the part can be increased.

The embodiment described above is merely an example of the present invention, and any modification and application may be made without departing from the subject matter of the present invention.

Furthermore, the application target of the present invention is not limited to the motorcycle 1, but it may be applied to saddle-type vehicles other than the motorcycle.

DESCRIPTION OF REFERENCE NUMERALS 1 motorcycle (saddle-type vehicle)
3 rear wheel
12 seat
13 head pipe
14 main frame
14A front-side tank stay (fuel tank supporting bracket)
16 suspension bracket (bracket)
17 seat frame
17c extension portion
24 fuel tank
27 rear cushion unit
30 engine
40 air cleaner box
55 fuel pump
55A fuel filter
75 engaging convex portion
241 space
250 vehicle body center line
L cylinder axis

The invention claimed is:

1. A saddle-type vehicle comprising:
a head pipe and one main frame disposed along a vehicle body center line extending from the head pipe in a front-and-rear direction of a vehicle body at the center in a vehicle width direction;
a fuel tank that contains a fuel pump is secured to an upper portion of the main frame;
a fuel filter located below the fuel tank; and
an engine located below the main frame, wherein
the saddle-type vehicle has a seat frame for supporting a seat and a bracket extending upwards from the rear end of the main frame,
a front portion of the seat frame is secured to the main frame-through the bracket,
the fuel filter is disposed in a space formed in an up-and-down direction between the main frame and the fuel tank, and
wherein a part of the fuel filter is disposed at a lower position than the front end of the seat frame.

2. The saddle-type vehicle according to claim 1, wherein an extension portion extending to a front side of the bracket is provided to a front end portion of the seat frame, and a rear end of the fuel tank is supported by the extension portion.

3. The saddle-type vehicle according to claim 1, wherein the bracket supports an upper end of a rear cushion unit for suppressing transmission of vibration from a rear wheel to the main frame side.

4. The saddle-type vehicle according to claim 1, wherein a fuel tank supporting bracket that extends upwards and supports the fuel tank is provided to a front end of the main frame.

5. The saddle-type vehicle according to claim 1, wherein a cylinder axis of the engine extends horizontally in the front-and-rear direction.

6. The saddle-type vehicle according to claim 1, wherein an air cleaner box is disposed at a front and upper side of the engine.

7. The saddle-type vehicle according to claim 1, wherein a front end of the seat mounted on the seat frame is supported on an upper surface of the fuel tank.

* * * * *